United States Patent
Giddens et al.

(10) Patent No.: US 7,142,592 B2
(45) Date of Patent: Nov. 28, 2006

(54) DETERMINING SPEED OF A DIGITAL SIGNAL IN A SERIAL TRANSMISSION LINE

(75) Inventors: L. Grant Giddens, Raleigh, NC (US); Charles Weston Lomax, Jr., Raleigh, NC (US); Ronald R. Munoz, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 874 days.

(21) Appl. No.: 10/137,246

(22) Filed: Apr. 30, 2002

(65) Prior Publication Data

US 2003/0202572 A1    Oct. 30, 2003

(51) Int. Cl.
    *H04B 17/00*    (2006.01)
(52) U.S. Cl. .................................................. 375/225
(58) Field of Classification Search ........... 375/225, 375/377; 370/232, 233, 234, 465
    See application file for complete search history.

(56) References Cited

U.S. PATENT DOCUMENTS

| | | | | |
|---|---|---|---|---|
| 5,222,081 A | * | 6/1993 | Lewis et al. | 375/369 |
| 5,631,925 A | * | 5/1997 | Koenzen | 375/225 |
| 5,654,983 A | | 8/1997 | Sauser, Jr. | |
| 5,982,837 A | * | 11/1999 | Earnest | 375/377 |
| 6,072,827 A | * | 6/2000 | Krulce | 375/225 |

* cited by examiner

*Primary Examiner*—Don N. Vo
(74) *Attorney, Agent, or Firm*—Fogg and Associates LLC; Scott V. Lundberg

(57) ABSTRACT

A device for determining speeds of a digital signal in a serial transmission line. The device comprises a first and second counter and a logic circuit. The first counter is adapted to count the duration of a first pulse in a first byte of the digital signal in the transmission line. The second counter is adapted to count the duration of a second pulse in the first byte. The logic circuit is coupled to the first and second counters. The logic circuit is adapted to compare the smallest duration of the first and second pulses with a plurality of pulse duration's of known baud rates to determine the baud rate of the digital signal in the transmission line.

42 Claims, 4 Drawing Sheets

DETERMINING SPEED OF A DIGITAL SIGNAL IN A SERIAL TRANSMISSION LINE

TECHNICAL FIELD

The present invention relates generally to the field of data communications or telecommunications and, in particular, a device for determining speeds of a digital signal in a serial transmission line.

BACKGROUND

Digital communication systems (DCS) incorporating, asynchronous, serial digital data signals typically transmit and receive bytes of information with the use of a universal asynchronous receiver/transmitter (UART). The digital signals are transmitted back and forth using a framing format. The framing format determines such bits in a byte as the number of data bits, parity bits and stop bits. The parity bits are used for error detection and the stop bits allow for a minimal idle interval so that subsequent bytes can be detected. To achieve successful communication between UARTs, the speed of the transmission signals sent back and forth must match. If the speeds are different, framing and parity errors can occur that will result in invalid communication between the two devices.

To assure proper matching of speeds between UARTs, it is desirable to allow one UART to dynamically match the speed of the other UART. Since a number of known speeds exits, a UART could simply cycle through known speeds upon receiving a signal until a match is found. Unfortunately, this could be a time consuming process. An alternative approach could be to use software to attempt to match bytes with known patterns. This approach, however, is slower and more complicated.

For the reasons stated above, and for other reasons stated below which will become apparent to those skilled in the art upon reading and understanding the present specification, there is a need in the art for an improved device and method of matching communication speeds.

SUMMARY

The above-mentioned problems with matching communication signals and other problems are addressed by embodiments of the present invention and will be understood by reading and studying the following description.

In one embodiment, a transmission speed detecting device for detecting the speed of a digital signal in a serial transmission line is disclosed. The device comprises a counting circuit and a logic circuit. The counting circuit is adapted to count the duration of a bit in a first byte of the digital signal in the serial transmission line. The logic circuit is coupled to the counting circuit to compare the duration of the bit in the first byte with duration values of known signal speeds and to select a transmission speed based at least in part on the comparison.

In another embodiment, yet another transmission speed detection device for detecting the speed of a digital signal in a serial transmission line is disclosed. The device comprises a first and second counter and a logic circuit. The first counter is adapted to count the duration of a first pulse in a first byte of the digital signal in the transmission line. The second counter is adapted to count the duration of a second pulse in the first byte. The logic circuit is coupled to the first and second counters. The logic circuit is adapted to compare the smallest duration of the first and second pulses with a plurality of pulse duration's of known baud rates to determine the baud rate of the digital signal in the transmission line.

In another embodiment, a shelf unit is disclosed. The shelf unit comprises a plurality of line cards, a plurality of multiplexer cards and a management card. The plurality of line cards are adapted to be selectively coupled to the shelf unit. The plurality of multiplexer cards are also adapted to be selectively coupled to the shelf unit. The management card is further adapted to be selectively coupled to the shelf unit. The management card performs management operations on the multiplexer cards and the line cards. The management card has a management port that is adapted to be coupled to an external terminal over a transmission line. The management card further includes a transmission speed detection device. The transmission speed detection device comprises a first counter, a second counter and a logic device. The first counter is adapted to count the duration of a first pulse in a first byte of a digital signal received over the transmission line from a remote universal asynchronous receiver/transmitter (UART) in the external terminal. The second counter is adapted to count the duration of a second pulse in the first byte of the digital signal. The logic circuit is coupled to the first and second counter. The logic circuit is adapted to compare the smallest duration of the first and second pulses with a plurality of pulse duration's of known baud rates to determine the baud rate of the signal from the remote UART.

In another embodiment, a method of matching the baud rate of a digital signal from an external universal asynchronous receiver/transmitter (UART) is disclosed. The method comprising, monitoring the external UART for bytes in a digital signal. Receiving a first byte. Counting the duration of a first pulse in the first byte. Counting the duration of a second pulse in the first byte. Comparing the smaller of the duration of the first and second pulses with a select number of previous determined UART baud rates and choosing a baud rate based at least in part on the comparison.

In yet another embodiment, a method of determining the transmission speed of a digital signal in a serial bus line is disclosed. The method comprising, monitoring the bus line for a signal. Receiving a first byte in a signal. Counting the duration of a single bit in the first byte. Comparing the duration of the single bit with a plurality of speed matching durations, wherein each speed matching duration is associated with known transmission speed. Selecting a transmission speed by matching the closest duration of the single bit with one of the plurality of speed matching durations.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
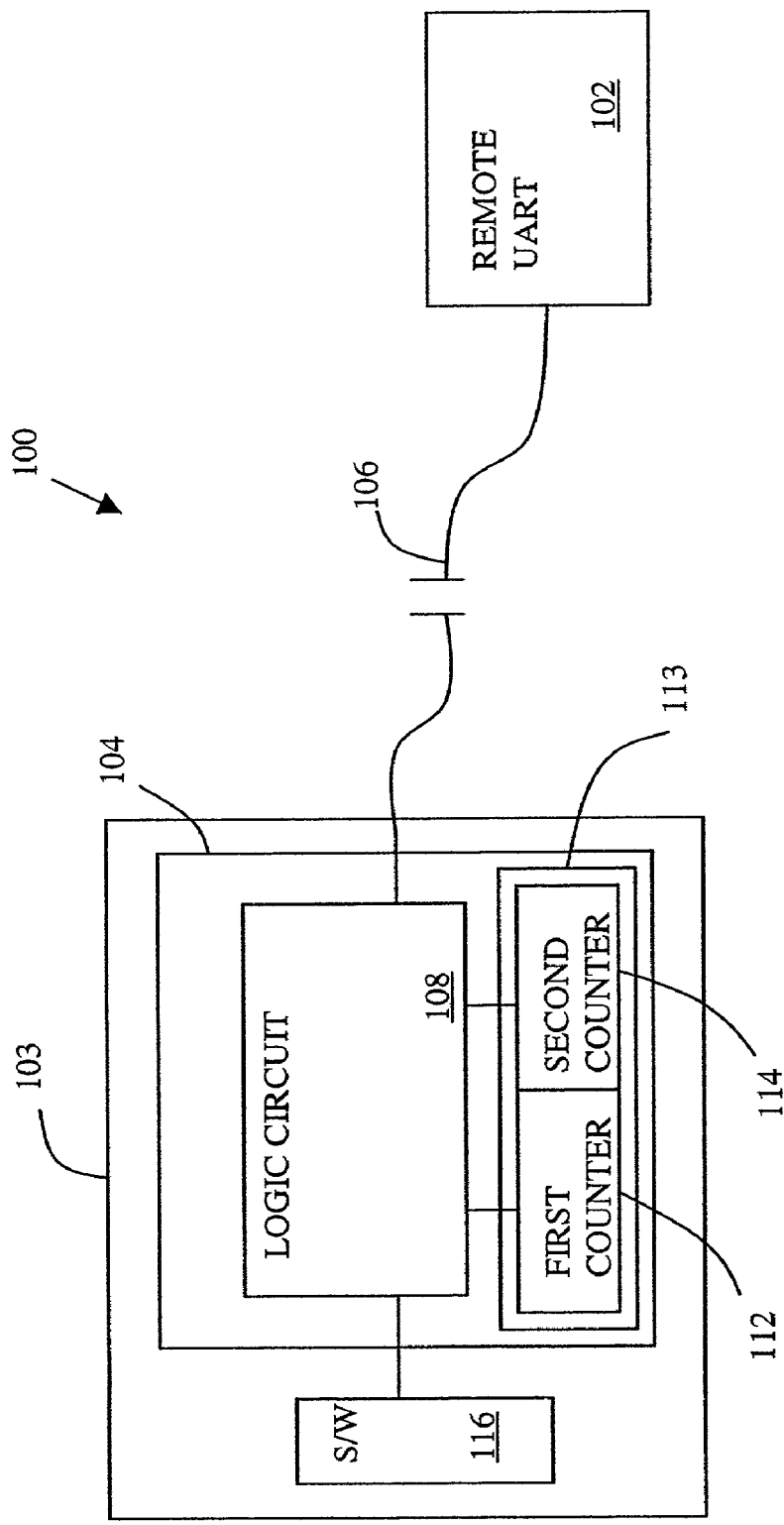
FIG. 1 is a block diagram of a communication system of one embodiment of the present invention.

Various embodiments of the present invention provide a way to automatically detect and match the transmission speed of a digital signal transmitted from a universal asynchronous receiver/transmitter (UART) or other serial transmitter. Referring to FIG. 1, one embodiment of a communication system 100 of the present invention is illustrated. As illustrated, the communication system 100 includes a remote UART unit 102 in communication with a communication device 103 via serial control bus 106 (transmission line 106).

The communication device 103 is illustrated as including a transmission speed detection device 104 and communication software 116. The transmission speed detection device 104 includes a logic circuit 108 and a counting circuit 113. The counting circuit 113 counts the duration of a bit in a byte of information. In the embodiment of FIG. 1, counting circuit 113 includes a first counter 112 and a second counter 114. Logic circuit 108 is coupled to receive digital signals from the remote UART unit 104. The logic circuit 108 monitors transmission line 106 for the transmission of a digital signal. The first counter 112 is adapted to count the duration of a first pulse in a first byte in the digital signal. In particular, in one embodiment, when the first pulse of a first byte in a digital signal is received, the first counter 112 is activated. That is, the start of the first pulse triggers on the first counter 112. Moreover, when the first pulse in the first byte is no longer being received, the first counter 112 is deactivated. That is, the end of the first pulse triggers off the first counter 112. In addition, the second counter 114 is adapted to count the duration of a second pulse in the first byte. In particular, in one embodiment, when the second pulse of the first byte is received, the second counter 114 is activated. In particular, the start of the second pulse triggers on the second counter 114. Moreover, when the second pulse in the first byte is no logger being received, the second counter 114 is deactivated. That is, the end of the second pulse triggers off the second counter 114. In one embodiment, the first pulse is a high pulse and the second pulse is a low pulse. In another embodiment, the first pulse is a low pulse and the second pulse is a high pulse. The logic circuit determines which duration (the duration of the first pulse or the duration of the second pulse) is smaller.

Figure 2:
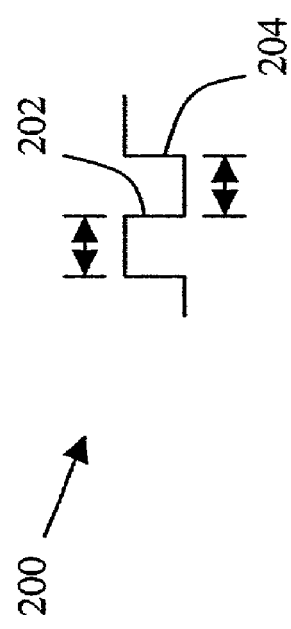
FIG. 2 is a diagram of an example of a partial byte in a digital signal.
Figure 3:
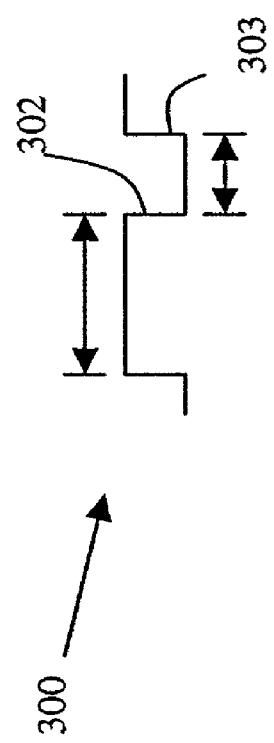
FIG. 3 is a diagram of an example of another partial byte in a digital signal.

An example of a partial signal byte 200 is illustrated in FIG. 2. As illustrated, this portion of byte 200 has a high pulse 202 (a first bit) followed by a low pulse 204 (a second bit). In the example of FIG. 2, it is relatively easy to determine the duration of a single bit because both the first high pulse and the second low pulse each contain a single bit. However, a byte may not contain a single high bit followed by a single second low bit. Embodiments of the present invention take this into consideration by determining the smallest duration of the first and second pulses in a byte. For example, referring to FIG. 3, partial byte 300 is illustrated. In byte 300, the high pulse 302 really represents two bits of information (the duration of the high pulse 302 is twice as long as the low pulse 303). Since it is desired to measure the duration of a single bit to determine the speed of the signal, the logic circuit 108 uses the smallest measured duration. Once the smallest duration is determined, the logic circuit compares the smallest duration with a plurality of duration values associated with known signal speeds (or baud rates).

Referring back to FIG. 1, the duration values are stored in logic in the transmission speed detection device 104. The duration values of known signal speeds (or baud rates) are stored in the logic prior to receiving the digital signal of which the speed is to be determined. The logic circuit 108 then compares the smallest duration of the first or second pulse to each of stored duration values. The logic circuit 108 then chooses a signal speed (baud rate) that is associated with one of the duration values that most closely matches the smallest of the first or second pulse.

In one embodiment of the present invention, the speed is then verified by comparing a second byte (character) with a known byte (character). In this embodiment, the logic circuit 108 monitors the transmission line 106 for a second byte (or verifying character). If the verifying character matches a pre-stored character, the speed has been correctly determined. The logic circuit 108 then signals communication software 116 the transmission speed to operate at and to take over communication functions. If the verifying character does not match, the logic circuit 108 starts over by monitoring for a first byte and continues the process from there.

The verifying character (or verifying byte) may be a character or byte that represents a key on a keyboard. For example, the verifying character may represent a space bar on a keyboard coupled to the remote UART unit 102. In this example, a user is instructed to depress the space bar. The verifying character that represents the space bar is sent by the remote UART 102, to the transmission speed detection device 104, when the space bar is depressed. Logic circuit 108 then receives and compares the verifying character to a known character (in this case a known character that represents a space bar at the selected baud rate) in the logic of the transmission speed detection device 104.

Figure 4:
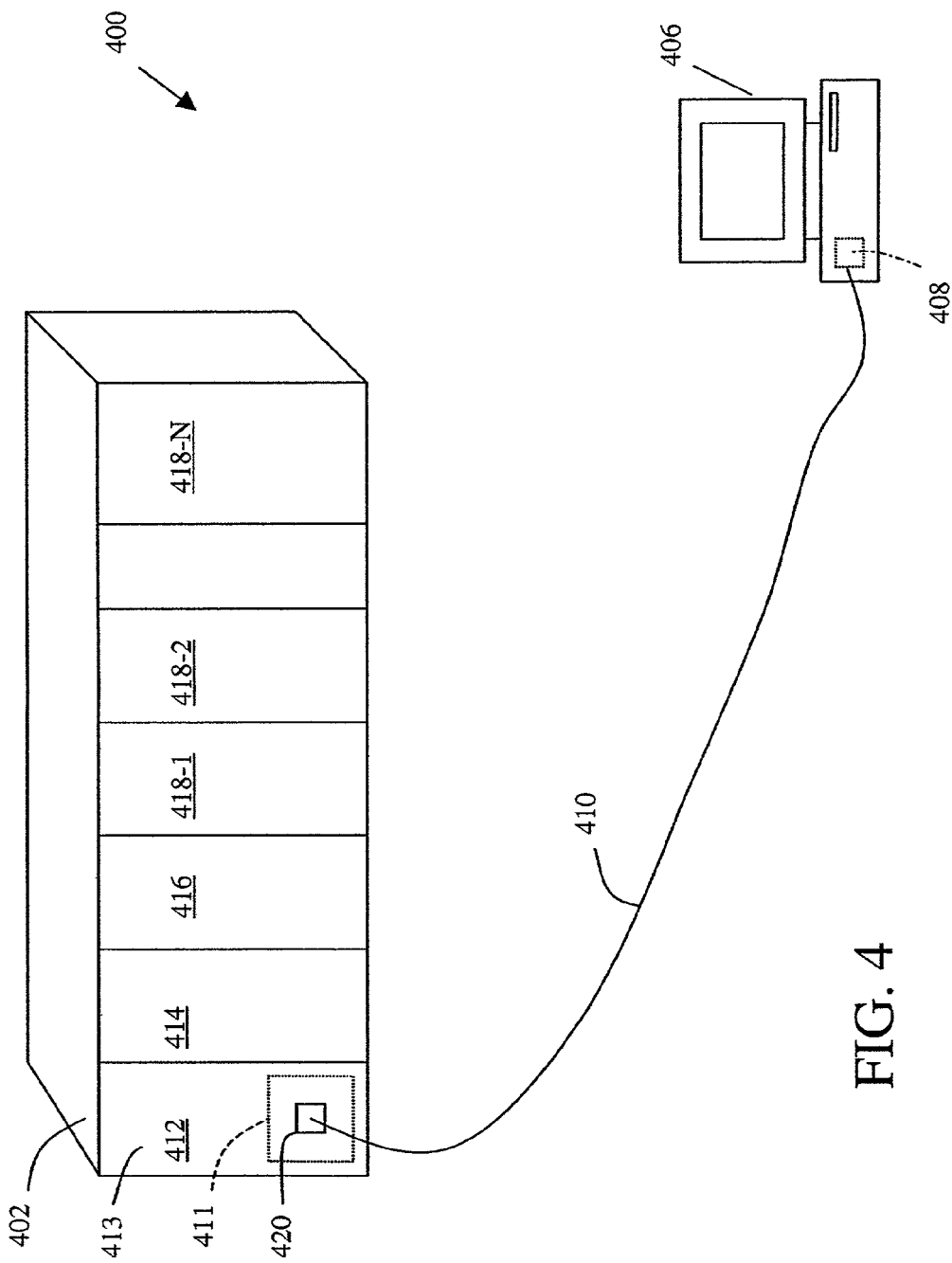
FIG. 4 is a block diagram of another communication system of one embodiment of the present invention.

Another embodiment of a communication system 400 of the present invention is illustrated in FIG. 4. As illustrated, this communication system 400 includes a shelf unit 402 that is in communication with a test personal computer (PC) 406 via a serial control bus 410 (transmission line 410). In this embodiment, the shelf unit 400 is shown as including a management card 412, multiplexer cards 414 and 416 and line cards 418 (1-N). The management card includes a transmission speed detection device 411 that is similar to the transmission speed detection device of FIG. 1. The management card 412 of FIG. 4 is also illustrated as having port 420. Port 420 selectively couples transmission line 410 to transmission speed detection device 411. In one embodiment, the port 420 is located in a front face 413 of the management card 412. The test PC 406 includes a remote UART 408 that, as illustrated, is coupled to transmission line 410. The test PC 406 may be used for such things as monitoring the functions of the management card 412 and the like. The management transmission speed detection device 411 includes a logic circuit and a first and second counter, as illustrated in the second UART 104 of FIG. 1. Moreover, the management transmission speed detection device 411 is adapted to determine the communication speed of the digital signals sent by remote UART 408 in a manner as described above.

Figure 5:
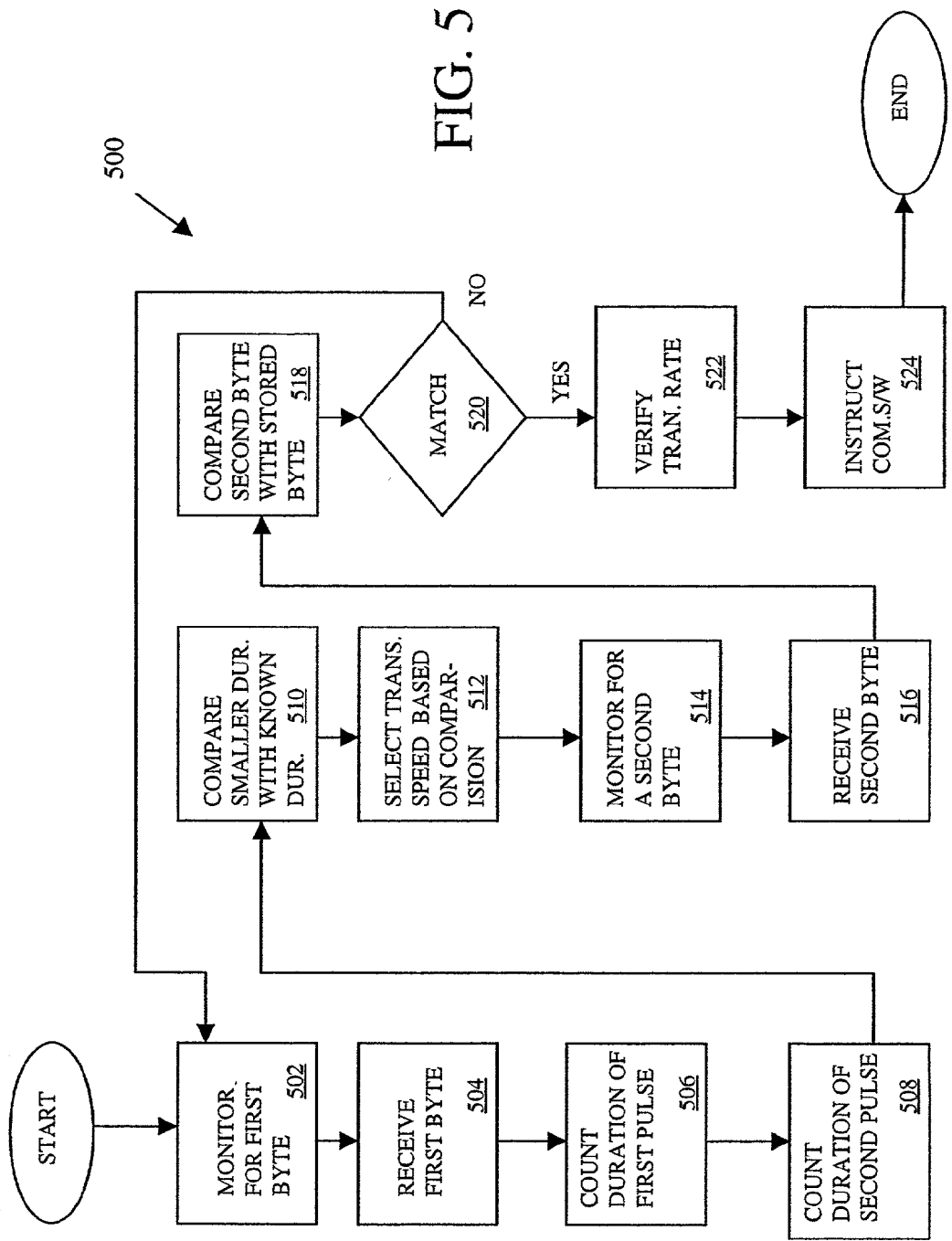
FIG. 5 is a flow chart illustrating one method of operating a transmission speed detecting device of the present invention.

A flow chart 500 illustrating one method of operating a transmission speed detection device of the present invention is illustrated in FIG. 5. As illustrated in flow chart 500, the method begins by first monitoring an incoming communication transmission line for a first byte in a digital signal (502). A first byte is received at (504). The duration of a first pulse of the first byte is counted (506). The duration of a second pulse of the first byte is then counted (508). The duration of the first pulse and the second pulse is compared to determine which duration is the smallest (510). The smallest duration between the first and second pulse is then compared to a plurality of known durations that are associated with known transmission speeds (512). That is, each of the plurality of known durations is associated with a known transmission speed. A transmission speed is selected based on comparing which of the known durations matches closest to the smallest duration between the first and second pulse (512). The transmission speed detection device then monitors the transmission line for a second byte (514). The second byte is received at (516). The second byte is then compared to a known byte (518). The known byte is associated with the selected transmission speed. That is, the known byte is correctly read at the selected transmission speed. If the second byte does not match the known byte (520), the transmission speed detection device starts over by monitoring for a first byte at (502). If the second byte does match the known byte (520), the transmission speed has been verified (522). The communication software is then informed of the transmission speed and that it can take over communication functions (524).

In one embodiment, a 50 MHz clock is used to run a counter of the present invention. This allows for the oversampling of incoming bits with enough samples to distinguish one baud rate from another. Referring to Table 1, an example of UART speeds supported in one embodiment is illustrated.

TABLE 1

| UART Speed (1) | Number of Samples for One Bit (2) | This rate is selected if the number of samples is LESS THAN (3) |
|---|---|---|
| 115.2 kbps | 434 | 651 |
| 57.6 kbps | 868 | 1,085 |
| 38.4 kbps | 1,302 | 1,953 |
| 19.2 kbps | 2,604 | 3,906 |
| 9.6 kbps | 5,208 | 23,437 |
| 1.2 kbps | 41,667 | |

Column (1) of Table 1 illustrates the UART baud rates supported in this embodiment. It will be understood in the art that other UART baud rates could be used without departing for the spirit of the present invention. Column (2) illustrates the actual number of samples for one bit in each baud rate. Column (3) represents the sample cut-offs that are used to determine which rate should be selected.

The number of bits in column (2) are determined by dividing the speed of the clock by the UART. For an example, at the 115.2 kbps UART speed the number of samples for one bit is 434. 50 Mhz/115.2 kbps=(50,000,000/115,200)=434.027 (which is rounded to the nearest whole number)

When a sample bit time is collected, the number of bits may not match exactly the values found in column (2). This may be due to inaccuracies between the two communicating devices. However, the number of samples collected should be close to those found in column (2). Therefore, in determining the speed of the incoming signal, the collected bit times are compared to the values in column (3). For example, if the number of samples collected is less than 651, then it is assumed the speed is 115.2 kbps. If the speed is not less than 651, but less than 1064, it is assume the speed is 57.6 kbps. As illustrated, in Table 1, speeds are determined down to 9.6 kbps in a similar fashion. If none of the speeds 115.2 kbps to 9.6 kbps are selected, then it is assume the speed is 1.2 kbps.

Column (3) of Table 1, is generated by taking the two samples from the adjacent speeds and finding the average. For example, the 651 rate is determined with the following equation: (434+868)/2=651. (651 samples represent the speed in the middle of 115.2 kbps and 57.6 kbps) This is all used to determine the speed of the incoming signal on the first incoming byte.

Once the speed has been "inferred", the speed is verified as described above. In particular, the speed is used to read the second incoming byte. If the second incoming byte matches the predefined verifying byte it is assumed that the speed has been correctly matched and the speed detection process is finished. If the second incoming byte does not match the predefined byte as read at the selected speed, then all counters are reset and the process starts over on the next incoming byte.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is intended that this invention be limited only by the claims and the equivalents thereof.

What is claimed is:

1. A transmission speed detecting device for detecting the speed of a digital signal in a serial transmission line, the device comprising:
    a counting circuit adapted to count for the durations of a two or more consecutive pulses of the digital signal in the serial transmission line to determine the durations of the two or more consecutive pulses; and
    a logic circuit coupled to the counting circuit to compare the smaller of the durations of the two or more consecutive pulses with a plurality of duration values of known signal speeds and to select a transmission speed based at least in part on the comparison.

2. The device of claim 1, wherein the logic circuit selects a transmission speed associated with the duration value closest to the smaller duration of the two or more consecutive pulses.

3. The device of claim 1, wherein the counting circuit further comprises:
    a first counter to count a first duration of a first pulse of the digital signal, and
    a second counter to count a second duration of a second pulse of the digital signal, wherein the logic circuit selects the smaller of the first or second durations.

4. The device of claim 1, wherein the logic circuit is further adapted to compare a second signal with a known signal to verify if the transmission speed has been determined.

5. The device of claim 1, wherein once the transmission speed has been determined the logic circuit signals to communication software the transmission speed.

6. The device of claim 1, wherein the logic circuit contains the plurality of duration values of known signal speeds.

7. The device of claim 1, wherein each duration of known values is determined by dividing the speed of the counting circuit by a known transmission speed.

8. A transmission speed detection device for detecting the speed of a digital signal in a serial transmission line, the device comprising:
a first counter adapted to count for the duration of a first pulse in a first byte of the digital signal in the transmission line to determine the duration of the first pulse;
a second counter adapted to count for the duration of a second pulse in the first byte to determine the duration of the second pulse; and
a logic circuit coupled to the first and second counters, the logic circuit adapted to compare the smallest duration of the first and second pulses with a plurality of pulse durations of known baud rates to determine the baud rate of the digital signal in the transmission line.

9. The device of claim 8, wherein the logic circuit is coupled to receive a second byte from the transmission line, the logic circuit further adapted to compare the second byte with a known byte to verify the matching of the baud rate.

10. The device of claim 8, wherein the logic circuit contains the plurality of pulse durations of known baud rates.

11. The device of claim 8, wherein the first counter, the second counter and the logic circuit are contained in management card that controls a shelf unit.

12. The device of claim 8, wherein the first counter is triggered on by the start of the first pulse in the first byte and triggered off by the end of the first pulse of the first byte.

13. The device of claim 8, wherein the second counter is triggered on by the start of the second pulse in the first byte and triggered off by the end of the second pulse in the first byte.

14. The device of claim 8, wherein the first counter is adapted to count the duration of a high logic pulse and the second counter is adapted to count the duration of a low logic pulse.

15. The device of claim 8, wherein the first counter is adapted to count the duration of a low logic pulse and the second counter is adapted to count the duration of a high logic pulse.

16. The device of claim 8, wherein each of the plurality of pulse durations of known baud rates is determined by dividing the speed of the first and second counters by a known transmission speed.

17. The device of claim 8, wherein the logic circuit determines the baud rate of the digital signal associated with the smallest duration of the first and second pulses by selecting the pulse duration of known baud rates that is closest to the smallest of the first and second pulses.

18. A shelf unit comprising:
a plurality of line cards adapted to be selectively coupled to the shelf unit;
a plurality of multiplexer cards adapted to be selectively coupled to the shelf unit; and
a management card adapted to be selectively coupled to the shelf unit, the management card is further coupled to perform management operations on the multiplexer cards and the line cards, the management card further having a management port adapted to be coupled to an external terminal over a transmission line, the management card further having a transmission speed detection device, the transmission speed detection device comprising,
a first counter adapted to count for the duration of a first pulse in a first byte of a digital
signal received over the transmission line from a remote universal asynchronous
receiver/transmitter (UART) in the external terminal to determine the duration of the first pulse,
a second counter adapted to count for the duration of a second pulse in the first byte of
the digital signal to determine the duration of the second pulse, and
a logic circuit coupled to the first and second counter, the logic circuit adapted to compare the smallest duration of the first and second pulses with a plurality of pulse durations of known baud rates to determine the baud rate of the signal from the remote UART.

19. The shelf unit of claim 18, wherein the management port is located in a front face of the management card.

20. The shelf unit of claim 18, wherein the management port is a serial port adapted to couple a serial cable to the management card.

21. The shelf unit of claim 18, wherein the logic circuit of the transmission speed detection device is coupled to receive a second byte, the logic circuit further adapted to compare the second byte with a known good byte to verify the matching of the baud rate.

22. The shelf unit of claim 21, wherein the logic circuit of the transmission speed detection device contains the plurality of pulse durations of known baud rates and the known verifying byte.

23. A method of determining the transmission speed of a digital signal in a serial bus line, the method comprising:
monitoring the bus line for a signal;
receiving a first byte in a signal;
counting the durations of two or more consecutive pulses to determine the duration of a single bit;
comparing the duration of the single bit with a plurality of speed matching durations, wherein each speed matching duration is associated with known transmission speed; and
selecting a transmission speed by matching the closest duration of the single bit with one of the plurality of speed matching durations.

24. The method of claim 23, wherein the counting of the durations of two or more consecutive pulses comprises:
counting the duration of more than one pulse in the byte; and
selecting the smallest duration counted as the duration of the single bit.

25. The device of claim 23, wherein each speed matching duration of known transmission speeds is determined by dividing the speed of a clock used to count the duration of a single bit by a known transmission speed.

26. The method of claim 23, further comprising:
monitoring the bus line for a second byte;
receiving a second byte;
comparing the second byte to a known byte; and
when the second byte matches the known byte, verifying the matching of the transmission speed.

27. The method of claim 26, further comprising:
when the second byte does not match the known byte, monitoring the bus line for a third byte;
counting the duration of a single bit in the third byte;

comparing the duration of the single bit with a plurality of speed matching durations, wherein each speed matching duration is associated with known transmission speed; and selecting a transmission speed by matching the closest duration of the single bit with one of the plurality of speed matching durations.

28. A method of matching the baud rate of a digital signal from an external universal asynchronous receiver/transmitter (UART), the method comprising:

monitoring the external UART for bytes in a digital signal;

receiving a first byte;

counting the duration of a first pulse in the first byte;

counting the duration of a second pulse in the first byte;

comparing the smaller of the duration of the first and second pulses with a select number of previous determined UART baud rates; and choosing a baud rate based at least in part on the comparison.

29. The method of claim 28, further comprising: monitoring an idle state for a defined period of time before receiving the first byte.

30. The method of claim 29, following the idle state for a defined period, further comprising:

initializing a first counter to count the duration of the first pulse in the first byte; and initializing a second counter to count the duration of the second pulse in the first byte.

31. The method of claim 28, wherein choosing the baud rate based on the comparison further comprises:

matching the smaller of the duration of the first and second pulse with a closest one of the previous determined UART baud rates.

32. The method of claim 28, further comprising:

receiving a second byte;

comparing the second byte with a known byte; and when the second byte matches the known good byte, verifying the matching of the baud rate.

33. The method of claim 32, further comprising:

monitoring the external UART for a predefined idle period before receiving the second byte.

34. The method of claim 32, further comprising:

when the second byte does not match the known byte, starting over by monitoring the external UART for a first byte.

35. A transmission speed detection device for detecting the speed of digital signals in a serial transmission line, the device comprising:

a first counter adapted to count for the duration of a first pulse of a digital signal in the transmission line to determine the duration of the first pulse;

a second counter adapted to count for the duration of a second pulse to determine the duration of the second pulse; and a logic circuit coupled to the first and second counters, the logic circuit adapted to compare the smallest duration of the first and second pulses with a plurality of pulse durations of known baud rates to determine the baud rate of the digital signal in the transmission line.

36. The device of claim 35, wherein the logic circuit is coupled to receive a second signal from the transmission line, the logic circuit further adapted to compare the second signal with a known signal to verify the matching of the baud rate.

37. The device of claim 35, wherein the first counter is triggered on by the start of the first pulse and triggered off by the end of the first pulse.

38. The device of claim 35, wherein the second counter is triggered on by the start of the second pulse and triggered off by the end of the second pulse.

39. The device of claim 35, wherein the first counter is adapted to count the duration of a high logic pulse and the second counter is adapted to count the duration of a low logic pulse.

40. The device of claim 35, wherein the first counter is adapted to count the duration of a low logic pulse and the second counter is adapted to count the duration of a high logic pulse.

41. The device of claim 35, wherein the logic circuit determines the baud rate of the digital signal associated with the smallest duration of the first and second pulses by selecting the pulse duration of known baud rates that is closest to the smallest of the first and second pulses.

42. The device of claim 35, wherein the first and second pulses are consecutive pulses.

* * * * *